United States Patent [19]
Gordon et al.

[11] Patent Number: 5,348,387
[45] Date of Patent: Sep. 20, 1994

[54] AUXILIARY BEARING AND DRIVE MECHANISM FOR A CONCRETE MIXER

[76] Inventors: Dale F. Gordon, 1356 N. 700 E., Avilla, Ind. 46710; William B. Benson, 1900 Eby Ave., Fort Wayne, Ind. 46802

[21] Appl. No.: 977,674

[22] Filed: Nov. 18, 1992

[51] Int. Cl.⁵ .................. F16D 1/04; B28C 5/20
[52] U.S. Cl. ........................ 366/63; 366/60; 403/336; 403/337; 403/338; 464/9
[58] Field of Search .............. 366/54, 56–59, 366/62, 63, 233; 403/335, 336, 338, 341; 464/182, 901

[56] References Cited

U.S. PATENT DOCUMENTS

| | | |
|---|---|---|
| Re. 32,043 | 12/1985 | Routson . |
| 1,985,610 | 12/1934 | Lee . |
| 2,838,291 | 6/1958 | Peebles . |
| 3,016,232 | 1/1962 | Domenighetti . |
| 3,097,006 | 7/1963 | Logue ............................ 403/337 |
| 3,136,165 | 6/1964 | Pitts . |
| 3,658,303 | 4/1972 | Funk ............................ 366/62 |
| 3,754,737 | 8/1973 | O'Dea . |
| 3,785,622 | 1/1974 | Johnson ........................ 366/63 |
| 3,851,862 | 12/1974 | Mihulowicz . |
| 3,897,936 | 8/1975 | Berthold ....................... 366/223 |
| 3,929,395 | 12/1975 | Stojek . |
| 4,097,925 | 6/1978 | Butler, Jr. . |
| 4,124,304 | 11/1978 | Suganuma ..................... 366/63 |
| 4,204,589 | 5/1980 | Loker .......................... 403/335 |
| 4,335,963 | 6/1982 | Jameson et al. . |
| 4,378,163 | 3/1983 | Jameson et al. . |
| 4,453,830 | 6/1984 | Jameson et al. . |
| 4,461,577 | 7/1984 | Mechem . |
| 4,641,978 | 2/1987 | Kapich . |
| 4,761,084 | 8/1988 | Benton et al. . |
| 4,786,179 | 11/1988 | Kaminski . |
| 4,811,992 | 3/1989 | Steiner . |
| 4,946,305 | 8/1990 | Dell'Acqua ................... 403/337 |
| 5,039,226 | 8/1991 | Lavoie . |
| 5,085,129 | 2/1992 | Dugan ......................... 403/338 |

FOREIGN PATENT DOCUMENTS 3121799  12/1982  Fed. Rep. of Germany ........ 366/54

*Primary Examiner*—Timothy F. Simone
*Assistant Examiner*—Terrence R. Till
*Attorney, Agent, or Firm*—Barnes & Thornburg

[57] ABSTRACT

A drive and bearing arrangement for a rotatable member such as a concrete mixing drum has a first drive mechanism for providing a rotational drive force to the drum, a primary bearing coupled to the primary drive mechanism and the drum for supporting an end of the drum, an auxiliary bearing for selectively and alternatively supporting the end of the drum in the event of failure of the primary bearing, and an auxiliary drive mechanism for providing a drive force to the drum when the end of the drum is supported by the auxiliary bearing. In one embodiment, the arrangement includes a drive flange coupled to the output of a transmission which includes the primary bearing, and a driven flange which is coupled to the rotatable drum. Auxiliary bearings are provided between the first and second flanges. A removable locking element is provided to rigidly lock the drive and driven flanges together when the primary bearing is rotatably supporting the end of the drum. In the event of failure of the primary bearing, the locking element may be removed to allow the drive and driven flanges to rotate, with the aid of the auxiliary bearings, relative to one another. The locking element may include removable bolts or pins which extend through openings in the drive and driven flange, or a locking ring which interacts with notches formed in the peripheries of the flanges to secure the flanges together.

19 Claims, 3 Drawing Sheets

AUXILIARY BEARING AND DRIVE MECHANISM FOR A CONCRETE MIXER

BACKGROUND AND SUMMARY OF THE INVENTION

This invention relates to an improved coupling between a drive mechanism and the mixing drum of a concrete mixer. More particularly, the present invention relates to an auxiliary drive and bearing apparatus with means for selectively disengaging the transmission from the mixing drum to allow the drum to freewheel about the axis of rotation in the event of a failure of the transmission.

Concrete mixing drums are well known in the art. Generally, they comprise a drive mechanism which rotates a large mixing drum. Usually mixing drums are tilted so that the major portion of the weight of the drum is borne by the lower mounting. The drive means for rotating a drum is generally connected to the drum at this same end.

A long-standing problem in the redi-mix industry arises when the drive mechanism on the rotating mixing drum of a concrete mixer fails or malfunctions. It is not uncommon for the drive or bearing mechanism to fail causing the mixing drum to stop rotating. This problem is further compounded if the mixing drum was loaded with concrete when the malfunction occurs. The costs associated with rehabilitating a mixing drum that has several yards of concrete hardened in its interior are relatively high.

Auxiliary or secondary drive mechanisms for concrete mixers have been proposed as a way to avoid this problem. Upon failure of the primary drive mechanism, an auxiliary drive mechanism can be engaged to rotate the mixing drum. See, for example, U.S. Pat. No. 4,097,925 to Butler, Jr. and U.S. Pat. No. 3,136,165 to Pitts. However, in conventional drive mechanisms, a failure of the primary bearings or drive mechanism will often lock the mixing drum in a stationary position, and then the mixing drum cannot be rotated even with an auxiliary drive mechanism. An auxiliary bearing and drive mechanism that permits rotation of the mixing drum regardless of the type of primary bearing or drive mechanism failure would be a substantial improvement over conventional drive mechanisms.

One object of this invention is to provide a secondary or backup bearing arrangement located between the primary drive and the mixing drum of the cement mixer to allow rotation of the mixing drum if the primary drive mechanism or bearings fail.

Another object of the invention is to provide secondary bearing coupling means for selectively disengaging the primary drive from the mixing drum so the mixing drum can freewheel about the axis of rotation in the event of a primary drive failure which would otherwise prevent the mixing drum from rotating.

Another object of the invention is to provide an auxiliary drive mechanism for engaging and rotating the concrete mixer mixing drum once the bearing coupling means has been disengaged.

According to the present invention, a drive and bearing arrangement for a rotatable member, such as a concrete mixing drum or the like, comprises first and second drive means for providing drive forces to the rotatable member, and first and second bearing means for rotatably supporting an end of the rotatable member. The first bearing means is coupled to the first drive means and the rotatable member. The second bearing means selectively and alternatively supports the end of the rotatable member and is coupled to the rotatable member and to the first bearing means.

The second bearing means can be selectively decoupled from the first bearing means to allow the second bearing means to alternatively support the end of the rotatable member. The decoupling means includes a removable locking element formed to selectively couple the second bearing means to the first bearing means.

According to one aspect of the invention, the second bearing means includes a first element coupled to the first drive means and a second element coupled to the rotatable member. The first element includes a first flange member and a first cylindrical member extending from the first flange member. The second element includes a second flange member and a second cylindrical member extending from the second flange member. The first and second cylindrical members are formed to engage and concentrically rotate relative to one another.

According to another aspect of the invention, the second bearing means includes a removable locking element for selectively coupling the first flange member to the second flange member. Removal of the locking element decouples the first flange member from the second flange member and allows the second flange member to rotate relative to the first flange member.

In one embodiment, the first and second flange members are formed to include a plurality of notches. The second bearing means includes a locking ring formed to include a plurality of notch engaging projections for engaging the notches to prevent relative movement between the first and second flanges.

In another embodiment, the first and second flange members are formed to include a plurality of apertures. The second bearing means includes a plurality of locking bolts for engaging the apertures to prevent relative movement between the first and second flanges.

According to another aspect of the invention, bearing elements are disposed between the first and second cylindrical members. These bearing elements reduce friction when the second bearing means is alternatively supporting the end of the rotatable member.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description refers particularly to the accompanying figures in which.

DETAILED DESCRIPTION OF THE DRAWINGS

Figure 1:
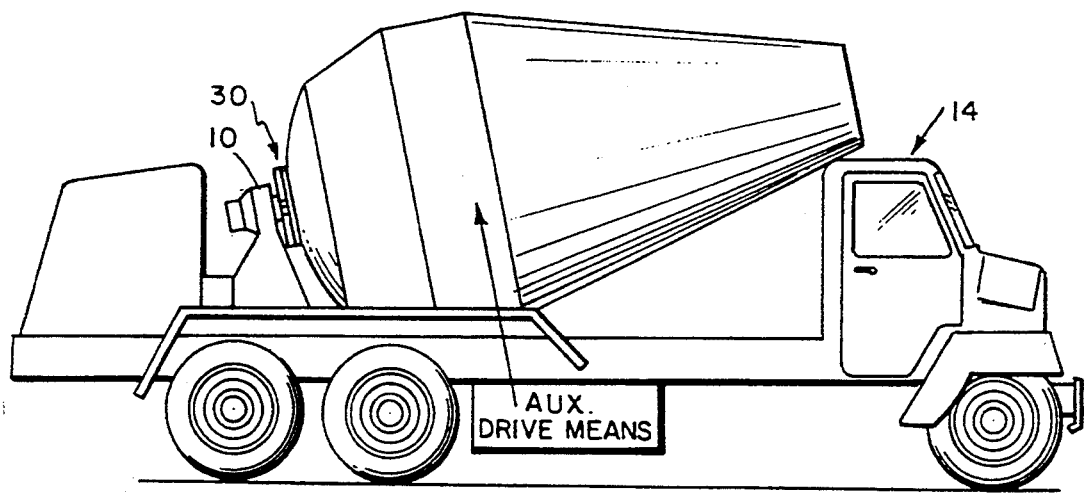
FIG. 1 is a side view of a cement truck illustratively showing the position of the auxiliary drive and bearing apparatus.

As shown in FIG. 1, auxiliary bearing mechanism 30 is installed between primary drive mechanism 10 and mixing drum 12 of a concrete mixing truck 14. Auxiliary drive 16 is illustratively attached to the frame of truck 14 and is provided for transmitting drive forces to mixing drive 12 when primary drive mechanism 10 is decoupled from mixing drum 12.

Figure 2:
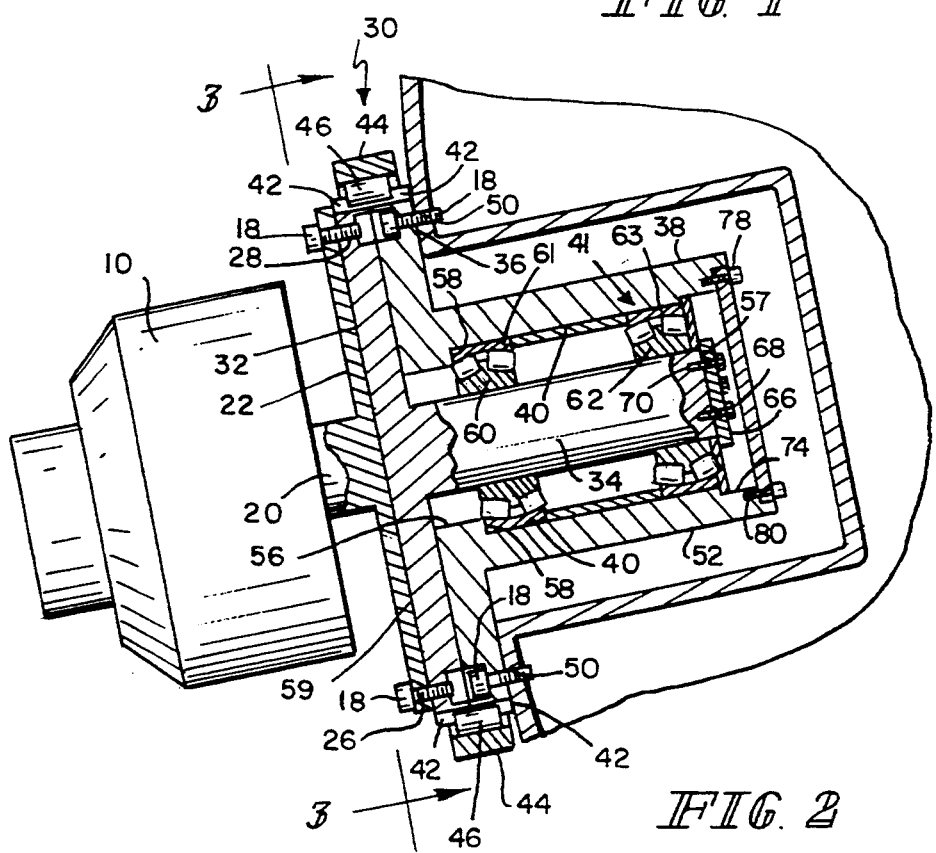
FIG. 2 is an enlarged sectional view of a portion of the embodiment of FIG. 1 showing a locking ring engaged to prevent the mixing drum flange from rotating relative to the drive flange.

As illustrated in FIG. 2, primary drive mechanism 10 is coupled to drive shaft 20 which is formed to include shaft flange 22. Auxiliary bearing mechanism 30 is formed to include drive flange 32 which is rigidly attached to shaft flange 22, and which has drive cylinder 34 projecting orthogonally therefrom. Auxiliary bearing mechanism 30 also includes mixing drum flange 36 which is rigidly attached to mixing drum 12, and which is formed to include mixing drum cylinder 38 extending orthogonally therefrom. Mixing drum cylinder 38 is sized and positioned to concentrically fit around drive cylinder 34, with bearing means 40 and 41 disposed therebetween.

Drive flange 32 and mixing drum flange 36 are formed to include notches 42 along their peripheral edges. Locking ring 44 is formed to include locking elements 46 which are sized and positioned to conformingly engage notches 42 formed on drive flange 32 and mixing drum flange 36. When engaged, or coupled, locking ring 44 prevents relative movement between drive flange 32 and mixing drum flange 36 and locks mixing drum 12 to primary drive mechanism 10.

In the event of failure of primary drive mechanism 10, locking ring 44 can be opened, thereby disengaging locking elements 46 from peripheral notches 42 in drive flange 32 and mixing drum flange 36. By disengaging locking elements 46 from peripheral notches 42, mixing drum flange 36 and cylinder 38 are free to rotate relative to one another, with bearing means 40 and 41 reducing friction therebetween.

In greater detail, it will be seen that drive shaft 20 is formed to include shaft flange 22 extending radially outwardly from axis of rotation 24 of primary drive mechanism 10. Threaded apertures 26 are formed in radially spaced-apart relation around the periphery of shaft flange 22.

Drive flange 32 of auxiliary bearing 30 is formed to matingly abut shaft flange 22 at mating surface 59. A plurality of apertures 28 are formed in spaced-apart relation along the periphery of drive flange 32, and are positioned to coaxially align with apertures 26 formed in shaft flange 22. Bolts 18 pass through apertures 26 formed in shaft flange 22 to threadingly engage apertures 28 in drive flange 32, thereby rigidly fastening drive flange 32 to shaft flange 22. Drive cylinder 34 projects orthogonally from drive flange 32 along axis of rotation 24.

Mixing drum flange 36 is formed to include apertures 48 in radially spaced-apart relation around the periphery of mixing drum flange 36 so as to coaxially align with apertures 50 formed in mixing drum 12. Bolts 18 pass through apertures 48 in mixing drum flange 36 and threadingly engage apertures 50 formed in mixing drum 12 to rigidly attach mixing drum flange 36 to mixing drum 12.

Mixing drum flange 36 is also formed to include annular projection 52 extending axially from mixing drum flange 36 along axis of rotation 24. Annular projection 52 has an outer diameter which is less than a diameter of recess 54 formed in mixing drum 12, and extends into recess 54. Mixing drum flange 36 is also formed to include central aperture 56. The diameter of central aperture 56 is less than the inner diameter of annular projection 52, thereby forming shoulder 58 inside annular projection 52. The diameter of central aperture 56 is also greater than the outside diameter of drive cylinder 34.

Bearings 40 and 41 for reducing friction are disposed between drive cylinder 34 and mixing drum cylinder 38. Illustratively, bearings 40 and 41 are spherical bearings. However, any friction reducing means can be used. As shown in FIG. 2, bearing 40 includes inner race 60 and outer race 61 and is disposed between drive cylinder 34 and mixing drum cylinder 38. Bearing 40 is axially positioned so that outer race 61 abuts shoulder 58. Bearing 41 includes inner race 62 and outer race 63 and is disposed between drive cylinder 34 and mixing drum cylinder 38. Spacer 64 is disposed between outer race 61 of bearing 40 and outer race of bearing 41.

Bearing retainer 72 is a generally flat plate axially positioned adjacent bearing 41 and shoulder 65, and having a center opening 73 which is just large enough to allow the bearing retainer 72 to slip over the end of drive cylinder 34. Bearing retainer 72 cooperates with spacer 64 to maintain bearings 40 and 41 axially positioned along drive cylinder 34. Bearing retainer 72 extends radially outwardly from axis of rotation 24 to lie adjacent shoulder 65 and engage notch 74 formed in mixing drum cylinder 38. Bearing retainer 72 is positioned to hold bearing 41 on shaft 34 while having the outer surface of bearing retainer 72 flush with the end 59 of drive cylinder 34.

End plate 66 is secured to drive cylinder 34 by end plate bolts 68 that threadingly engage apertures 70 formed in the end 59 of drive cylinder 34. The edges of end plate 66 overlap bearing retainer 72 and prevent bearing retainer 72 and bearing 41 from moving axially beyond end 59 of drive cylinder 34.

Cover plate 76 is rigidly attached to mixing drum cylinder 38 by bolts 78 which threadingly engage apertures 80 formed in mixing drum 38. Cover plate 76 reduces the risk of entry of contaminants into bearings 40 and 41.

Figure 3:
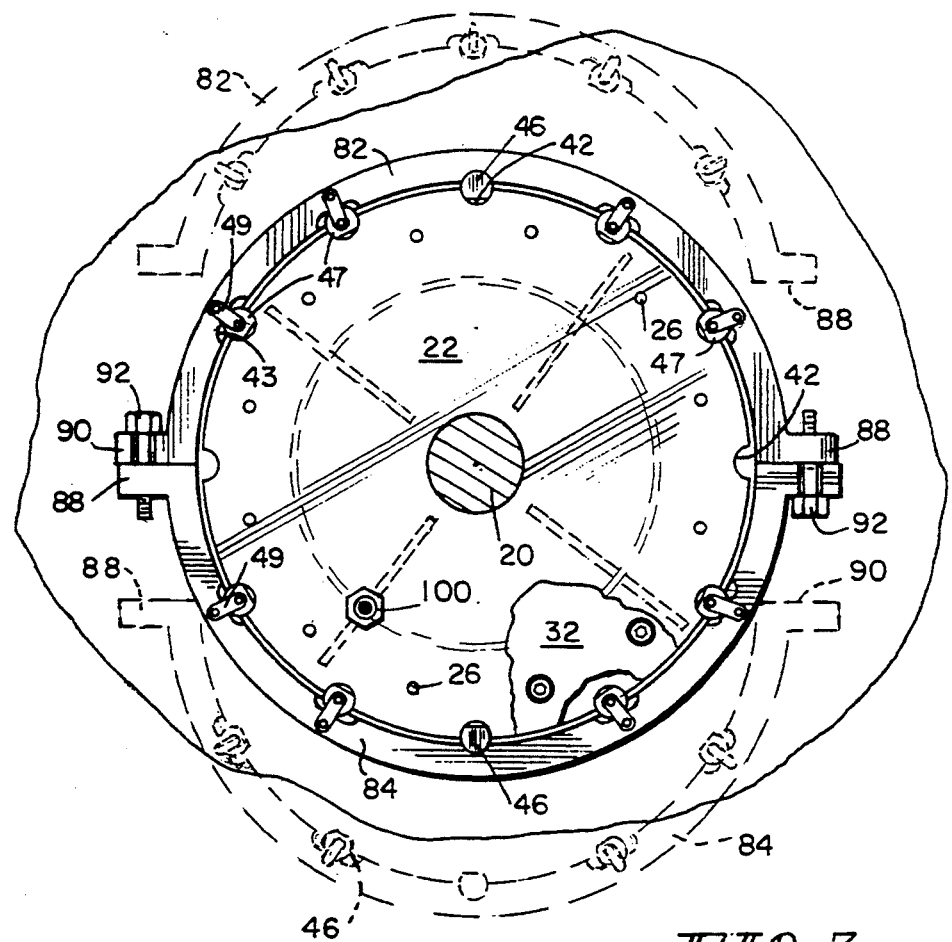
FIG. 3 is a sectional view taken along lines 3—3 of FIG. 2 and partially broken away showing the locking ring engaged in its locking position in solid, and disengaged in phantom.

As shown in FIG. 3, drive flange 32 and mixing drum flange 36 are formed to include peripheral notches 42. Locking ring 44 is shown engaging (in solid lines) peripheral notches 42 of drive flange 32 and mixing drum flange 36.

Locking ring 44 is formed from two members 82, 84 bolted together to encircle flanges 32 and 36. Members 82 and 84 are movable between an engaged, or coupled, position shown in solid lines and a disengaged, or uncoupled, position shown in dotted lines. Locking ring member 82, 84 are formed to include fastening flanges 88, 90, respectively. In the embodiment shown in FIG. 3, bolt 92 passes through an aperture (not shown) in fastening flange 90 to threadingly engage an aperture (not shown) formed in fastening flange 88, thereby rigidly maintaining locking ring 44 in the engaged, or coupled position. Removal of bolts 92 allows members 82, 84 of locking ring 44 to be separated, thereby allowing relative movement between drive flange 32 and mixing drum flange 36.

Figure 4:
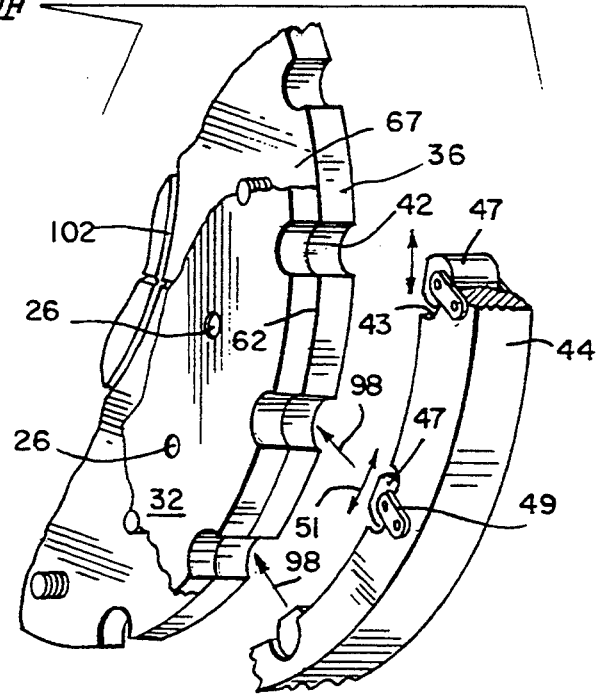
FIG. 4 is a perspective view partially broken away showing the alignment of the drive flange with the mixing drum flange to enable the locking ring to engage and prevent the two flanges from rotating freely relative to one another.

Locking ring 44 includes elongated notches 43 and pivoting locking elements 47, as best seen in FIG. 4. Pivoting locking elements 47 are pivotably linked to locking ring 44 by links 49 on both sides of the elements 47 and ring 44 which are pinned to pivoting locking elements 47 and locking ring 44. Elements 47 are free to move laterally in the direction of arrow 51. Thus, as the ring 44 is installed, elements 47 can move within the elongated notches 43 so as to align with their respective notches 42 in flanges 32 and 36. When elements 47 engage notches 42, flanges 32 and 36 are coupled to each other and relative movement between them is prevent. In one embodiment of the invention, the pivoting elements 47 are provided on either side of the two center elements 46 (top and bottom elements as seen in FIG. 3), which are rigidly mounted to locking rings 44.

FIG. 4 shows the alignment of peripheral notches 42 formed in drive flange 32 and mixing drum flange 36 as locking ring 44 is moved in the direction of arrow 98 into engagement with drive flange 32 and mixing drum flange 36. Locking ring cylinders 46, 47 are dimensioned to extend across drive flange 32 and mixing drum flange 32, and conformingly engage peripheral notches 42, thereby ensuring that peripheral notches 42 on drive flange 32 remain aligned with peripheral notches 42 formed on mixing drum flange 36. Thus, drive flange 32 and mixing drum flange 36 are rigidly coupled together.

Friction reducing means in addition to bearings 40 and 41 is provided by a grease fitting 100 of conventional design. Grease fitting 100 is provided in shaft flange 22 and communicates via internal channel (not shown) with grease grooves 102 formed in mating surface 69 of mixing drum flange 32. Grease can be pumped by conventional methods through grease fitting 100 and the internal channel to fill grease grooves 102 with grease. Similar grooves may be provided in surface 67 of drive flange 36, and a similar grease fitting may be provided in flange 36 as required or desired. The layer of grease deposited between mating surfaces 67 of mixing drum flange 36 and 69 of drive flange 32 reduces friction between these surfaces when flanges 32 and 36 rotate relative to one another. It will be appreciated that other friction reducing means can be used within the scope of the invention. For instance, a thrust bearing, of any type well known to one of ordinary skill in the art, could be interposed between the mixing drum flange 36 and the drive flange 32.

Figure 5:
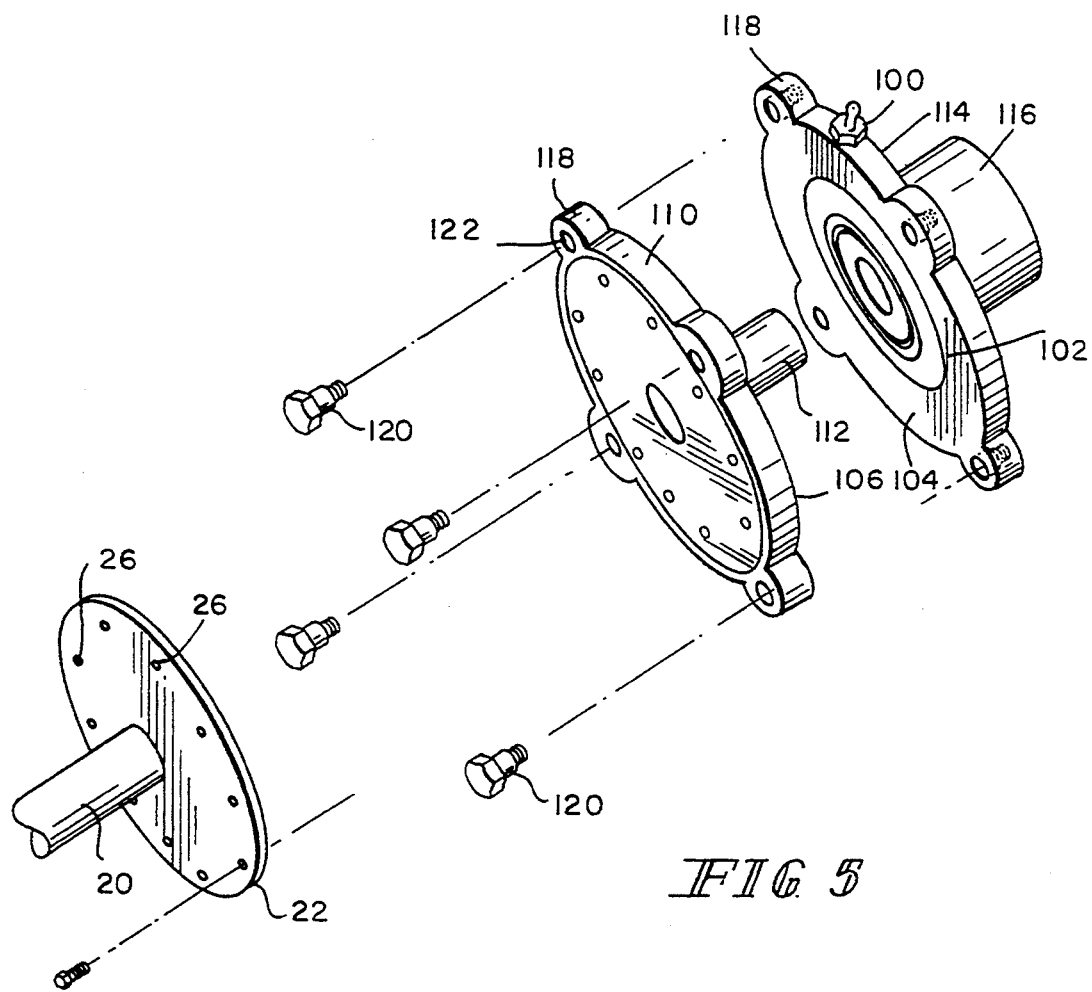
FIG. 5 is a perspective view of an alternative embodiment of a releasable coupling used to selectively engage and disengage the primary drive from the mixing drum.

FIG. 5 illustrates an alternative embodiment of the present invention. Drive shaft 20, shaft flange 22, and threaded apertures 26 are essentially identical to those described with reference to FIG. 2. Drive flange 110 is formed to include drive cylinder 112 extending orthogonally therefrom, and mixing drum flange 114 is formed to include mixing drum cylinder 116 extending orthogonally therefrom. Flanges 110, 114, and cylinders 112, 116 matingly engage each other in a fashion substantially identical to that described with reference to FIG. 2. However, the coupling/uncoupling means differs from that described with reference to FIG. 2.

In the embodiment of FIG. 5, essentially semi-circular projections 118 are formed in radially spaced-apart relation along the peripheral edges of flanges 110, 114. Projections 118 are coaxially aligned when flanges 110, 114 are properly aligned. Bolts 120 pass through apertures 122 formed in projections 118 formed on drive flange 110, and threadingly engage apertures 124 formed in mixing drum flange 114, thereby rigidly coupling drive flange 110 to mixing drum flange 114. Removal of bolts 120 from apertures 122, 124, allows mixing drum flange 114 to rotate relative to drive flange 110 in a fashion identical to that described with respect to FIG. 2. Although bolts 120 are used to couple, or engage, flanges 110, 114, other suitable coupling means can be used, such as locking pins or cotter keys.

Although the invention has been described in detail with reference to certain preferred embodiment, variations and modifications exist within the scope and spirit of the invention as described and defined in the following claims.

What is claimed is:

1. A drive and bearing arrangement for a concrete mixing drum, the arrangement comprising in combination:

a rotatably supported mixing drum, drive means for providing drive forces to the mixing drum;

first bearing means, coupled to the drive means and the mixing drum, for rotatably supporting an end of the mixing drum; and second bearing means for selectively and alternatively supporting the end of the mixing drum;

wherein the second bearing means is initially fixedly coupled to the mixing drum and to the first bearing means; and wherein the second bearing means includes means for selectively decoupling the second bearing means from the first bearing means to allow the second bearing means to alternatively support the end of the mixing drum and provide for rotation of said mixing drum.

2. The arrangement of claim 1, wherein the decoupling means includes a removable locking element formed to selectively couple the second bearing means to the first bearing means.

3. The arrangement of claim 1, wherein the second bearing means includes a first element coupled to the drive means and a second element coupled to the mixing drum.

4. The arrangement of claim 3, wherein the first element includes a first flange member and a first cylindrical member extending from the first flange member, and the second element includes a second flange member and a second cylindrical member extending from the second flange member and the second cylindrical member is formed to engage and concentrically rotate relative to the first cylindrical member.

5. The arrangement of claim 4, wherein the second bearing means includes a removable locking element for selectively coupling the first flange member to the second flange member so that removal of the locking element decouples the first flange member from the second flange member and allows the second flange member to rotate relative to the first flange member.

6. The arrangement of claim 4, wherein the first and second flange members are formed to include a plurality of notches and the second bearing means includes a locking ring formed to include a plurality of projections for engaging the plurality of notches to prevent relative movement between the first and second flanges.

7. The arrangement of claim 4, wherein the first and second flange members are formed to include a plurality of apertures and the second bearing means includes a plurality of locking bolts for engaging the plurality of apertures to prevent relative movement between the first and second flanges.

8. The arrangement of claim 4, further including bearing elements disposed between the first and second cylindrical members to reduce friction when the second bearing means is alternatively supporting the end of the mixing drum.

9. A support bearing mechanism for use with a concrete mixer having a transmission coupled to a mixing drum for rotatably supporting and transmitting a drive force to the mixing drum for rotating the mixing drum about an axis, the mechanism comprising:

means for selectively and rotatably supporting the mixing drum independently of the transmission to allow the drum to freely rotate about the axis, said means comprising a first element coupled to the transmission and a second element coupled to the mixing drum, wherein the first element includes a first flange member and a first cylindrical member extending from the first flange member, and the second element includes a second flange member and a second cylindrical member extending from the second flange member and the first cylindrical member is formed to engage and concentrically rotate relative to the second cylindrical member.

10. The mechanism of claim 9, wherein the means for selectively and rotatably supporting the drum further includes a plurality of bearing elements disposed between the first cylindrical member and the second cylindrical member for reducing friction during rotation of the second cylindrical member relative to the first cylindrical member.

11. The mechanism of claim 9, wherein the means for selectively and rotatably supporting the drum further includes a removable locking element for selectively coupling the first flange member to the second flange member so that removal of the locking element decouples the first flange member from the second flange member and allows the second flange member to rotate relative to the first flange member.

12. The mechanism of claim 9, wherein the means for selectively and rotatably supporting the drum further includes a removable locking element for engaging the first member and the second member so that the first member drives the second member when the locking element is engaged and the second member rotates relative to the first member when the locking element is disengaged.

13. The mechanism of claim 12, wherein the first and second members are formed to include a plurality of notches and the removable locking element includes a lock ring formed to include a plurality of notch engaging projections.

14. The mechanism of claim 12, wherein the first and second elements are formed to include a plurality of lock element receiving apertures and the removable locking element includes a plurality of lock bolts for insertingly engaging the lock element receiving apertures to couple the first member to the second member.

15. In a concrete mixer having a frame, a mixing drum mounted on the frame, a transmission mounted on the frame for rotatably supporting and driving the drum about an axis of rotation, and means for coupling the transmission to the mixing drum, the improvement wherein said coupling means comprises:

output means connected to the transmission;

input means connected to the mixing drum; and means for selectively connecting the output means to the input means to transmit drive forces from the transmission to the mixing drum, and for selectively disconnecting the output means from the input means to disconnect the transmission from the mixing drum to allow the mixing drum to freewheel about the axis of rotation;

wherein the output means includes a first flange member coupled to the transmission and the input means includes a second flange member coupled to the mixing drum.

16. The improvement of claim 15, wherein the first flange member is formed to include a first cylindrical member and first means for receiving the connecting/disconnecting means and the second flange member is formed to include a second cylindrical member and second means for receiving the connecting/disconnecting means.

17. The improvement of claim 16, wherein the first and second receiving means include a plurality of notches formed on the first and second flange members, respectively, and the connecting/disconnecting means includes a removable locking ring formed to include a plurality of notch-engaging projections.

18. The improvement of claim 16, wherein the first and second receiving means include apertures and the connecting/disconnecting means includes a plurality of removable locking bolts for insertingly engaging the apertures.

19. The improvement of claim 16, wherein the first and second cylindrical members are formed to concentrically and rotatably engage one another, and further comprising bearing means disposed between the first and second cylindrical members.

* * * * *